United States Patent [19]

Schmidt

[11] 4,419,832
[45] Dec. 13, 1983

[54] AIRCRAFT ATTITUDE DISPLAY INSTRUMENT

[75] Inventor: Donald F. Schmidt, Cedar Rapids, Iowa

[73] Assignee: Rockwell International Corporation, El Segundo, Calif.

[21] Appl. No.: 346,452

[22] Filed: Feb. 8, 1982

[51] Int. Cl.³ ............................................. G01C 19/00
[52] U.S. Cl. ..................................................... 33/329
[58] Field of Search ................. 33/328, 329, 330, 322, 33/351

[56] References Cited

U.S. PATENT DOCUMENTS 3,039,200  6/1962  Vibert ................................. 33/328

FOREIGN PATENT DOCUMENTS 212685  3/1957  Australia .............................. 33/328
769939  3/1957  United Kingdom .................. 33/329

Primary Examiner—Harry N. Haroian
Attorney, Agent, or Firm—Terry M. Blackwood; Howard R. Greenberg; H. Fredrick Hamann

[57] ABSTRACT

An aircraft attitude indicator employing a gyro driven tape display. The tape takes the form of a closed loop stretched about a carrier mechanism, and includes a viewable horizon indication. The tape further includes a set of perforations which, preferably, are engaged and driven by sprocket teeth borne on a sprocket wheel member attached to the pitch gimbal of the gyro. The tape travels in response to tilt of the gyro spin axis relative to the aircraft, and in a direction so that reversed pitch sensing is accomplished.

11 Claims, 3 Drawing Figures

AIRCRAFT ATTITUDE DISPLAY INSTRUMENT

This invention relates to aircraft flight instruments and in the preferred embodiment to a gyro driven attitude display.

An aircraft atitude indicator provides a substitute horizon which a pilot uses for reference when the true horizon is obscured by weather or darkness or when the pilot is otherwise flying under instrument flight rules (IFR). Conventional attitude displays have a stationary aircraft symbol at instrument center, and therebehind, a horizon line or reference which translates up or down as the aircraft pitches, and which also rotates clockwise or counterclockwise as the aircraft banks. Such horizon line is typically driven by or from a gyro whose spin axis is oriented according to true vertical. Typical also is a requirement for some apparatus which inverts the pitch information from the gyro and which causes the horizon line to move in accordance with the inverted information. That is, as the aircraft pitches up, the instrument horizon line should move down, and vice versa.

Previous systems for accomplishing this inversion have employed complex gear trains, servo systems, and the like. Another approach using a figure eight belt drive is shown in U.S. Pat. No. 3,911,591.

In accordance with the present invention, there is featured the provision of an attitude indicator incorporating simplified means for relating gyro motion to artificial horizon motion. In accordance with a preferred feature, a flat display of horizon is provided. These and other features, objects, and advantages of the invention will become more apparent upon reference to the following specification, claims, and appended drawings in which:

Figure 1:
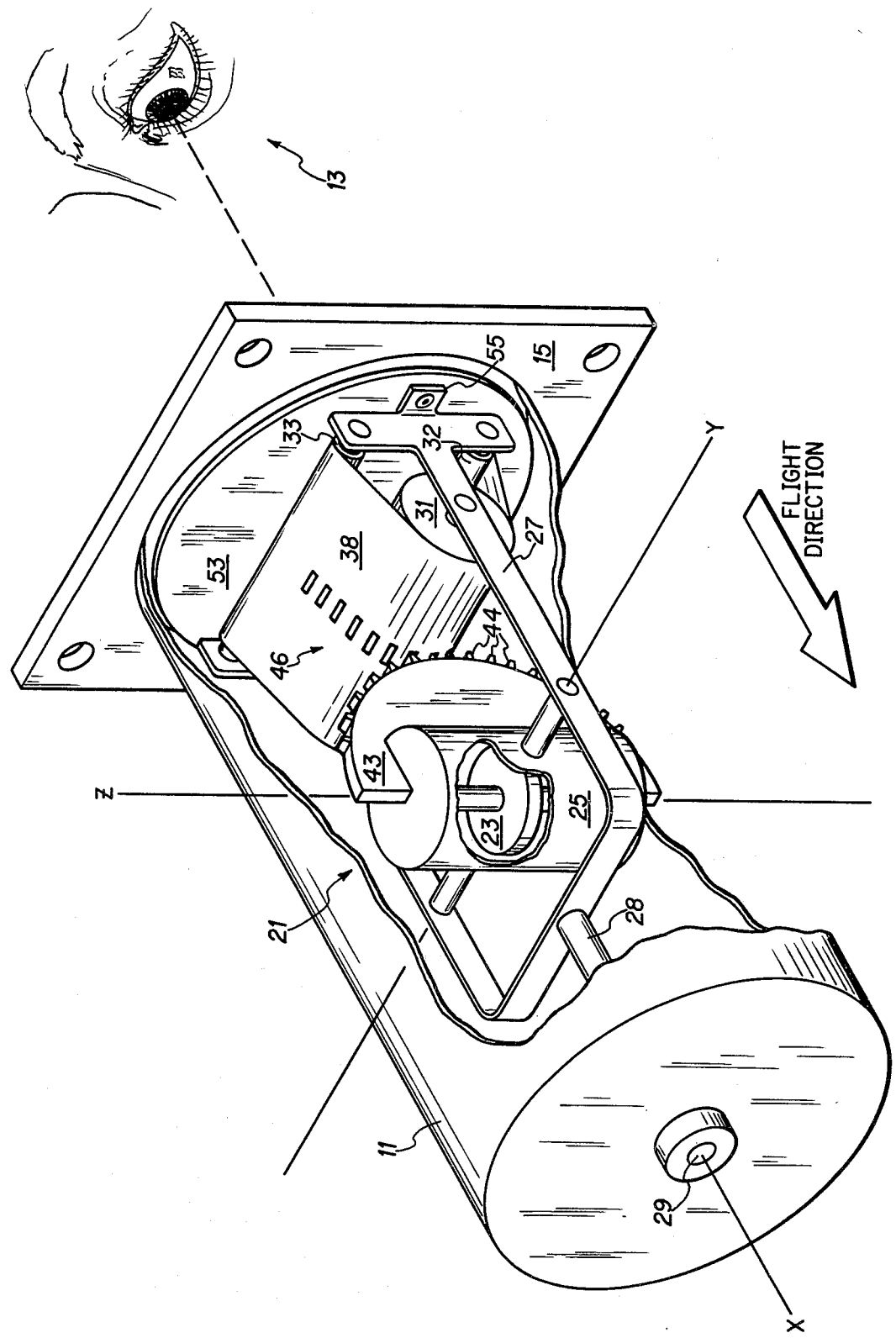
FIG. 1 is a perspective view from the rear representing the presently preferred embodiment.

Turning now to FIG. 1, the illustrated instrument comprises a gyro driven tape display of aircraft attitude which is contained within a housing 11 fixedly attached to and within the aircraft and which is viewable by a pilot or other observer 13 through an opening in faceplate and bezel assembly 15. What the observer sees will be more fully explained hereinbelow in conjunction with FIGS. 2 and 3, but presently still referring to FIG. 1, the instrument includes a vertical gyro 21 comprising a gyro wheel 23, an inner gimbal 25, and an outer gimbal 27. Gimbal axis X is perpendicular to gimbal axis Y. The instrument is mounted within the aircraft such that gimbal axis X is the gimbal roll axis and such that the gimbal axis Y is the gimbal pitch axis. Axis Z is the gyro wheel spin axis and is aligned with true vertical. Means for spinning wheel 23 are not shown but may be chosen from a variety of conventional erecting means.

Outer or roll gimbal 27 comprises a yoke-like, somewhat U-shaped member having a tongue 28 which is journaled in a bearing assembly 29 at the rear of housing 11. Inner or pitch gimbal 25 is journaled in roll-gimbal-supported bearings (not shown) so as to be supported by, and capable of angular movement within, the roll gimbal. Gyro wheel 23 is journaled in pitch-gimbal-supported bearings (not shown) so as to be supported by, and capable of spinning within, the pitch gimbal. Also supported by roll gimbal 27 is a tape carrier mechanism which comrises three cylindrical rollers or idler wheels 31, 32, and 33 mounted between the T-shaped ends of gimbal 27. A tape 38, which comprises a continuous closed loop of suitable flat material, is carried and supported by the three idler wheels 31, 32, and 33, said idler wheels allowing movement of the tape loop and also defining a somewhat triangular path around which tape 38 may travel.

A sprocket wheel member 43, which has sprocket teeth 44 distributed around the wheel rim or edge, is attached to pitch gimbal 25. Wheel 43 is thus coupled with the spin axis so as to angularly move or rotate, in correspondence with the spin axis, about the gimbal axis Y. Tape 38 has therein a row of perforations 46 which are suitable for being engaged by teeth 44 of wheel 43. Idler wheel 31 has a clearance providing groove or recess 34, located under the row of perforations 46, which is suitable for permitting the teeth 44 to mesh into and with perforations 46. See FIG. 2. Tape 38 as viewed from the front (see FIG. 2) also has thereon suitable viewable markings 39 for indicating the horizon, and also the pitch magnitude.

Figure 2:
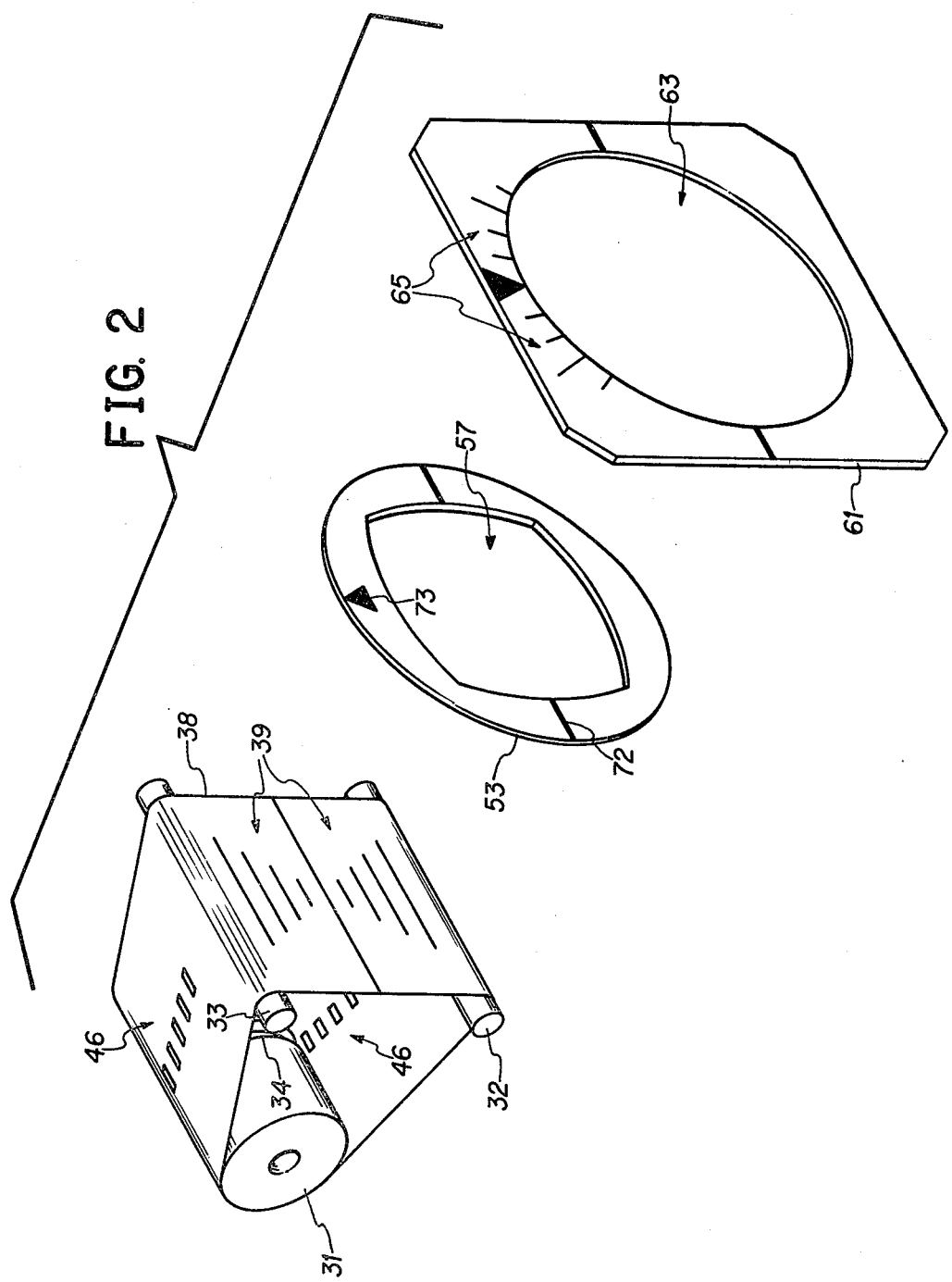
FIG. 2 is an exploded perspective view from the front representing part of the apparatus of FIG. 1.
Figure 3:
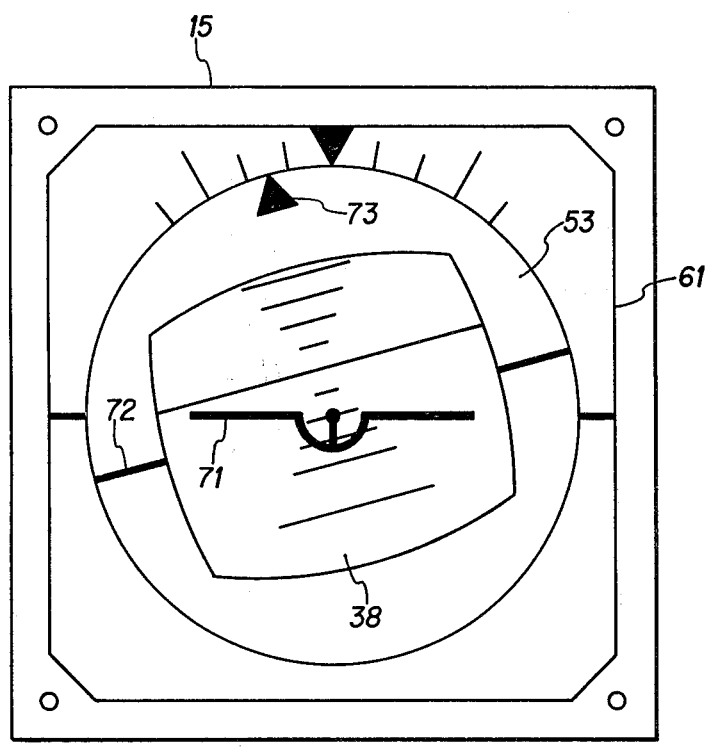
FIG. 3 is a front view of the apparatus of FIG. 1.

A circular mask 53 is located immediately in front of tape 38 and is attached to roll gimbal 27 by suitable means such as tabs 55 extending from the ends of gimbal 27. As seen in FIGS. 2 and 3, mask 53 has located centrally therein a four-sided cutout or window 57 for permitting viewing of markings 39 and tape 38. Tape 38 is free to travel up or down relative to mask 57.

A second mask 61, mounted in the bezel assembly so as to be fixed relative to the housing 11, has centrally located therein a circular window 63, and is located either immediately in front of, or substantially coplanar with, mask 53. Mask 61 bears viewable markings 65 for providing a measure of roll or bank magnitude.

A stationary miniature aircraft symbol 71 (see FIG. 3) is fixed relative to housing 11 through a pitch trim linkage, or calibration adjustment mechanism (not shown), and appears superimposed on the tape 38. Except for adjustability in pitch, the symbol 71 is immobile and serves as a reference symbol relative to which tape 38 and mask 53 may move.

In operation, and referring again to FIG. 1, when the aircraft pitches up, the X axis tilts up about the Y axis. However, the vertically aligned Z axis maintains its vertical orientation and does not move. Thus, the angle between the X and the Z axes becomes less than 90°. That is, relative to the instrument, the wheel 43 rotates counterclockwise (as viewed from the FIG. 1 aspect) when the aircraft pitches up. As the sprocket teeth 44 move along with wheel 43, said teeth (each of which engages a corresponding one of perforations 46) drive the perforations and thus the tape 38 and cause tape 38 to move along its somewhat triangular path in a clockwise direction. Thus, the zero degree pitch mark (i.e., the horizon line) on tape 38 will move down below the stationary aircraft symbol 71 and the pilot or other observer will perceive from the instrument that the aircraft is pitched up.

Similarly, when the aircraft pitches down, wheel 43 will rotate clockwise and such rotation will be transmitted through teeth 44 to produce a counterclockwise rotation of ttape 38. The zero degree pitch mark on tape 38 will move up above the stationary symbol 71 and the pilot will perceive from the instrument that the plane is pitched down.

The desired reversal of pitch information from the gyro is thus accomplished.

As the aircraft banks to the pilot's right, the instruments housing rotates counterclockwise (as viewed from the FIG. 1 aspect) about axis X while axis Z maintains its vertical orientation. To the aircraft pilot (and from his aspect) the mask 61 appears to remain fixed while the tape 38 and mask 53 appear to rotate counterclockwise. From the apparent counterclockwise rotation of the markings on mask 53 the pilot thus perceives that his aircraft is in a bank to the right. That is, roll angle is indicated by the relationship between the aircraft symbol 71 and the horizon line 72 on mask 53, as well as the position of the delta shaped bank pointer 73 on mask 53 with respect to the fixed bank scale 65 at the top of mask 61. Aircraft banks to the pilot's left result in opposite but analogous movements and indications.

The attitude condition represented in FIG. 3 is one wherein the aircraft is banking to the right and has its nose pitched down.

Turning now to other details of the FIG. 1 apparatus, the radius of the wheel 43 is related to the tape pitch sensitivity (inches of tape movement per degree of pitch displayed) in that the arc length of the wheel 43 for 1° of gyro rotation equals the display pitch sensitivity. Also, since the wheel member 43 employed in the FIG. 1 apparatus is only about one-half, or 180°, of a full 360° wheel, an appropriate weight may be applied to the pitch gimbal to effect a counterbalancing of the 180° wheel portion.

Turning now to some examples of alternatives or modifications which are presently contemplated, idler wheel 31 could be modified to include sprocket teeth which projected outwardly through the perforations in tape 38. Simultaneously, wheel 43 would be replaced with a drive wheel having teeth-compatible or teeth-receiving recesses along its rim or edge. That is, the teeth would no longer be on the drive wheel but would instead be on the idler wheel and would project through the perforations into the mating recesses in the drive wheel.

Further exemplary of possible modifications, the wheel 43 of FIG. 1 could be something other than a 180° wheel portion. In some applications it may be useful to employ a full 360° wheel having teeth distributed completely therearound while simultaneously employing a tape 38 whose row of perforations continues completely around the tape so that there is a closed loop of perforations.

Further exemplary, it may be desirable in some applications to replace large roller 31 with two smaller rollers such that the defined path for tape 38 is a four sided, somewhat rectangular path, rather than the three sided, somewhat triangular path of the FIG. 1 apparatus. Gimbal 27 of course would be modified to accept and carry four rollers instead of three.

Thus, while various embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. An attitude indicator instrument for aircraft comprising:
   gyroscopic first means having a spin axis which is capable of angular movement, relative to said aircraft, about a further axis,
   second means comprising a strip of material suitable for bearing visible markings, said strip containing perforations and being formed into a closed loop,
   third means for supporting, and allowing movement of, said second means, said third means defining a path around which said second means may travel,
   fourth means for engaging said perforations, and
   fifth means for coupling said fourth means with said first means such that angular movement of the spin axis relative to the aircraft causes movement of said fourth means which in turn drives the second means around its path in a direction opposite to the angular movement of the spin axis.

2. An instrument as defined in claim 1 wherein said strip of material comprises a strip of substantially flat material.

3. An instrument as defined in claim 1 or 2 wherein said fourth means comprises a plurality of teeth suitable for coupling into said perforations, and said fifth means comprises a member attached to said first means, and said teeth are located on said fifth means.

4. An instrument as defined in claim 3 wherein said fifth means comprises at least a portion of a wheel having a rim on which said teeth are located.

5. An instrument as defined in claim 1 or 2 and including a sixth means for providing a viewable reference indication indicative of a reference attitude of said aircraft about said further axis,
   and wherein said strip bears a viewable indication which moves with said strip and cooperates with said reference indication for indicating the attitude of said aircraft relative to said reference attitude.

6. An instrument as defined in claim 1 or 2 wherein said further axis is now designated as a second axis, and wherein said spin axis is also capable of angular movement, relative to said aircraft, about a third axis, said second and third axes being substantially perpendicular to one another.

7. An instrument as defined in claim 6 wherein angular movement of said spin axis about said second axis results from a change in aircraft pitch, and wherein angular movement of said spin axis about said third axis results from a change in aircraft roll.

8. An instrument as defined in claim 3 and including a sixth means for providing a viewable reference indication indicative of a reference attitude of said aircraft about said further axis,
   and wherein said strip bears a viewable indication which moves with said strip and cooperates with said reference indication for indicating the attitude of said aircraft relative to said reference attitude.

9. An instrument as defined in claim 8 wherein said further axis is now designated as a second axis, and wherein said spin axis is also capable of angular movement, relaive to said aircraft, about a third axis, said second and third axes being substantially perpendicular to one another.

10. An instrument as defined in claim 9 wherein angular movement of said spin axis about said second axis results from a change in aircraft pitch, and wherein angular movement of said spin axis about said third axis results from a change in aircraft roll.

11. A gyroscopic instrument for aircraft comprising:
    a gyroscope comprising (i) a gyro wheel having a vertical spin axis and (ii) pitch and roll gimbals supporting said gyro wheel and permitting both pitch and roll movement of said spin axis relative to said aircraft, a closed loop of flat tape bearing one or more viewable indications and containing a plurality of perforations, a tape carrier means for supporting said tape and defining a closed path over which the tape may travel, said tape carrier means being supported by the roll gimbal, sprocket wheel means comprising at least a portion of a wheel having sprocket teeth suitable for meshing with said perforations, said sprocket wheel means being attached to said pitch gimbal so as to drive said tape perforations and thus said tape in response to pitch movement of the spin axis.

* * * * *